United States Patent [19]
Mantani et al.

[11] Patent Number: 5,605,090
[45] Date of Patent: Feb. 25, 1997

[54] BREAD MAKER

[75] Inventors: Nobunori Mantani; Hisanobu Tanaka, both of Osaka, Japan

[73] Assignee: Funai Techno-Systems Co., Ltd., Osaka, Japan

[21] Appl. No.: 585,582

[22] Filed: Jan. 16, 1996

[30] Foreign Application Priority Data

Jan. 20, 1995 [JP] Japan .................................. 7-026025

[51] Int. Cl.[6] .............................. A21B 1/00; A21D 8/00; A47J 27/00; A47J 37/01
[52] U.S. Cl. ................... 99/326; 99/331; 99/348; 99/468; 364/400; 366/98; 366/146; 366/314; 366/601
[58] Field of Search ............................. 99/325–331, 337, 99/338, 348, 352–355, 467, 468, 483–486; 366/69, 96–98, 144–147, 601, 314; 426/504, 512; 364/400

[56] References Cited

U.S. PATENT DOCUMENTS 5,363,746  11/1994  Gordon ..................................... 99/328
5,415,081   5/1995  Yoshida et al. ........................... 99/326

Primary Examiner—Timothy F. Simone
Attorney, Agent, or Firm—Jordan and Hamburg

[57] ABSTRACT

A bread maker for baking a bread, having a memory for memorizing appropriate processing time data previously for kneading, rising and baking dough in accordance with a ratio of water to the weight of the ingredients. The data includes plural levels to be operated. In the bread maker, a ratio of the weight of water to the weight of the ingredients is calculated based on the weighed value, and which level the ratio belongs to is judged. Then, appropriate processing time for kneading, rising and baking in accordance with the ratio are set automatically, so that high-quality bread can be always made.

16 Claims, 6 Drawing Sheets

F I G. 4
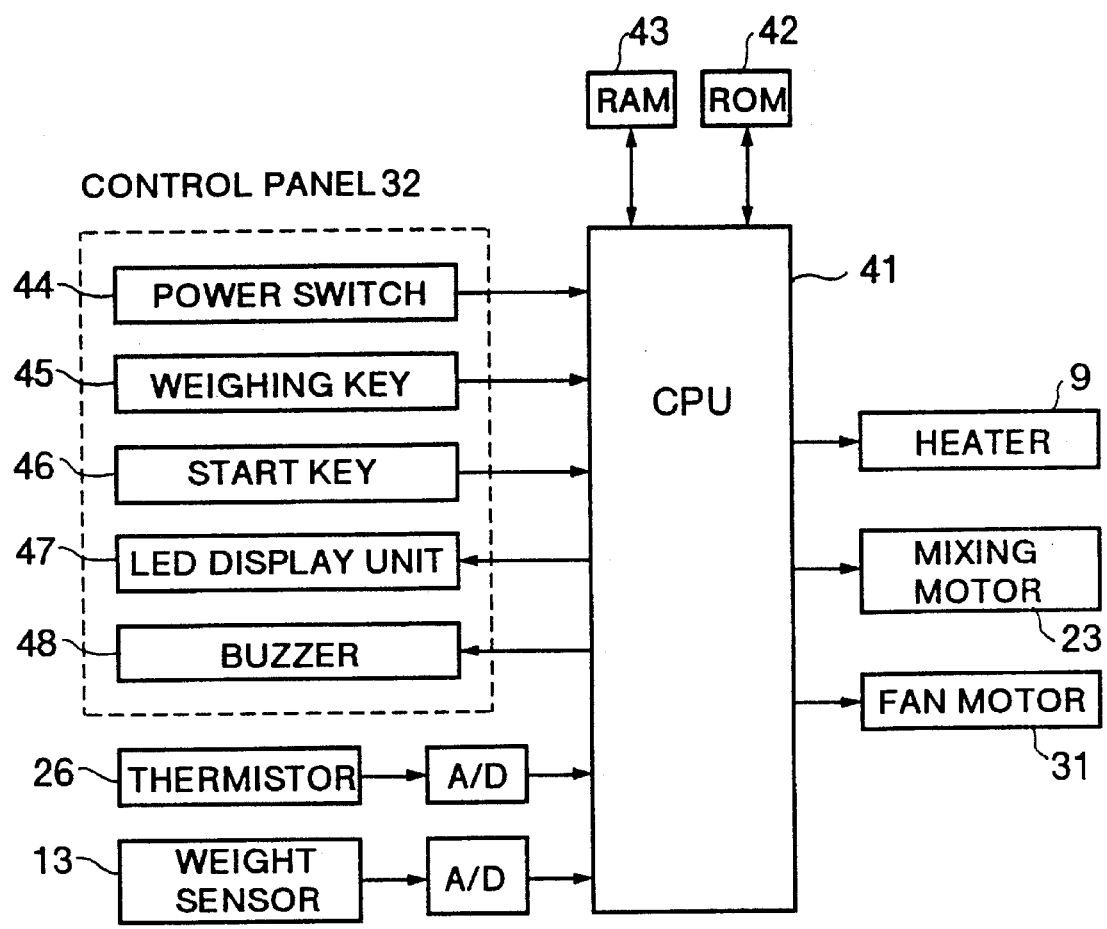

FIG. 7

|  | ratio of water to ingredients | | | | |
| --- | --- | --- | --- | --- | --- |
|  | level 0 | level 1 | level 2 | level 3 | level 4 |
| first mixing | 10min. | 10min. | 10min. | 12min. | 14min. |
| interval | 50min. | 50min. | 50min. | 50min. | 50min. |
| second mixing | 21min. | 21min. | 21min. | 23min. | 25min. |
| rising | 20min. | 20min. | 20min. | 19min. | 18min. |
| making a ball | 10sec. | 8sec. | 6sec. | 6sec. | 6sec. |
| final rising | 54min. | 52min. | 50min. | 45min. | 40min. |
| baking | 43min. | 45min. | 47min. | 47min. | 47min. |

BREAD MAKER

FIELD OF THE INVENTION

The present invention relates to a bread maker, which is provided a bread case that ingredients and water are placed into, capable of kneading, rising and baking dough and being placed into the bread case.

Conventionally there is known a bread maker as a household apparatus capable of making a bread wherein flour, yeast and the like ingredients for dough are placed into the bread case, kneaded, risen and baked. In such bread maker, by carrying out sequentially a kneading process for mixing ingredients of the dough, a rising process for rising kneaded dough and a baking process for baking risen dough, bread making is performed. Then, for each process mentioned above, a standard time is applied to a predetermined weight of ingredients and water and each process is carried out automatically. Also, an apparatus in which the standard processing time is changeable suit to an operator's liking is known (for example, referring to Japanese Laid-Open Patent Publication No. 6-28012).

However, using the above-stated bread maker, is troublesome because there is need to weigh the ingredients and water precisely. To avoid this trouble, the operator prepares the ingredients and water measured roughly by eye without using any measuring instrument, and if their weight or volume are above or below the regulation, the operator fails to make a high-quality bread.

SUMMARY OF THE INVENTION

The present invention is made to resolve the above-mentioned problem. An object of the present invention is to provide a bread maker, in which, even if the weight of the ingredients to the weight of water is above or below the regulation, in accordance with the ratio of the weight, the processing times for kneading, rising and baking are adjusted automatically therefore, even if the ingredients and water are prepared roughly by eye measurement without using any measuring instrument, high-quality bread can always be made.

In accomplishing the above-mentioned object, according to the present invention, each processing time for the kneading process in accordance with a ratio of weight of water to weight of ingredients, the rising process for rising kneaded dough and the baking process using a heating means is previously obtained experimentally and the data is stored in a memorizing means. The ingredients placed into a bread case are weighed by a first weighing means, then, water poured into the bread case is weighed by a second weighing means. Based on the value weighed by the first and second weighing means, a ratio of the weight of water to the weight of the ingredients is calculated by a calculating means. A control means reads out data stored in the memorizing means corresponding to calculated ratio of the weight of water to the weight of the ingredients and, based on read out data, each processing time for kneading, rising and baking are carried out sequentially. As the result, even if the ratio of the weight of water to the weight of the ingredients varies, the bread making process is always executed properly.

Also, according to the present invention, by first operation of a weighing order key, a first weighing operation is done and, by a second operation of the weighing order key, second weighing operation is done.

And, according to the present invention, the bread case is provided with a weight sensor, so that first and second weighing operations for the ingredients and water placed into the bread case can be directly executed.

Furthermore, according to the present invention, when the ratio of weight of the water to the weight of the ingredients is out of predetermined range, it is Judged an error operation, and a user can be warned or urged to reset.

BRIEF DESCRIPTION OF THE DRAWINGS

The above-mentioned object and features of the present invention will become apparent from the following description taken in conjunction with the preferred embodiment thereof with reference to the accompanying drawings.

FIG. 4 is a block diagram of a control circuit of the bread maker.

FIG. 7 is a chart showing processing times in accordance with ratios of water to ingredients.

DESCRIPTION OF THE PREFERRED EMBODIMENTS

An embodiment of the present invention is concretely described hereinafter accompanying with drawings.

Figure 1:
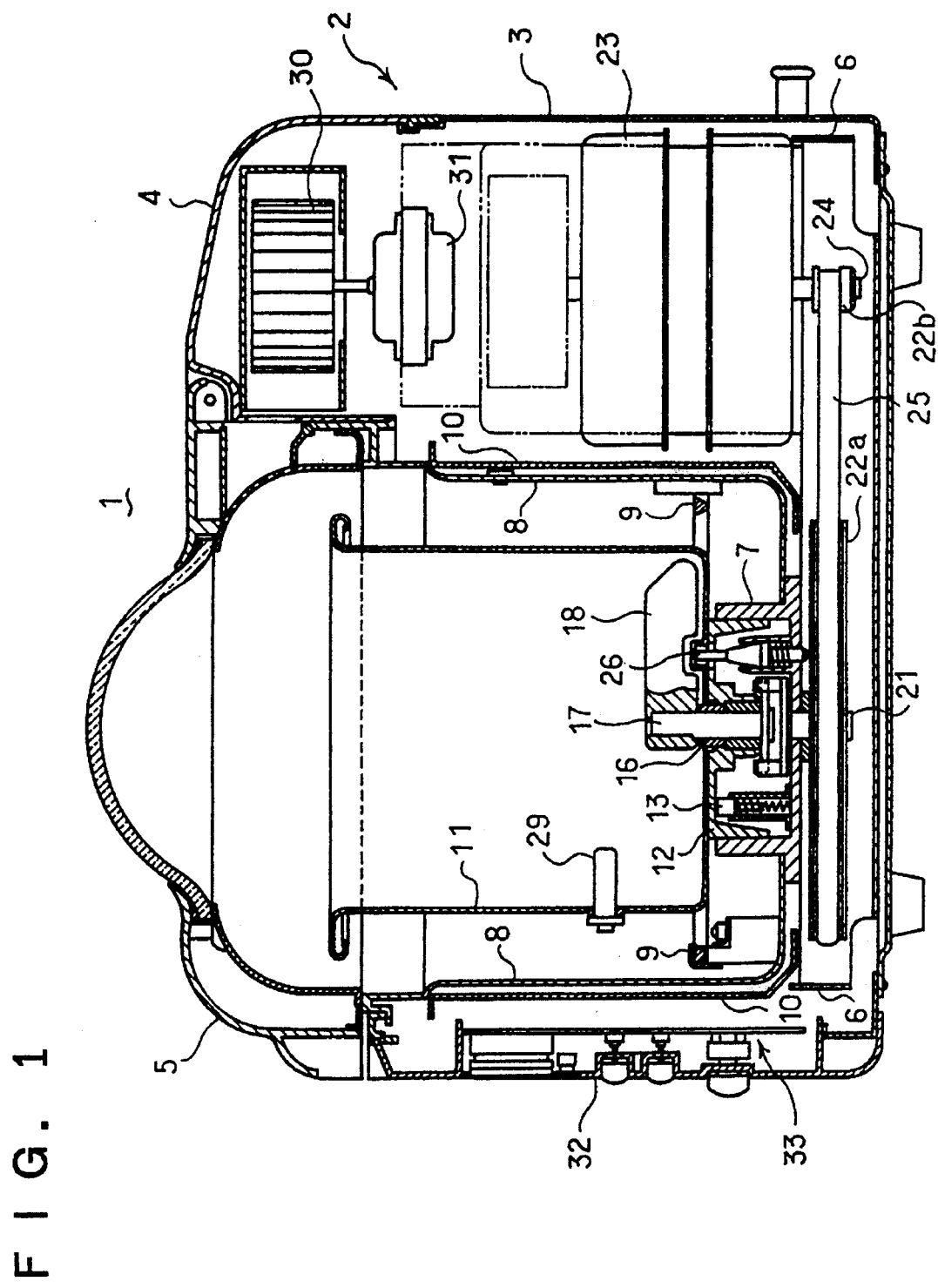
FIG. 1 is a sectional view of a bread maker of an embodiment of the present invention.
Figure 2:
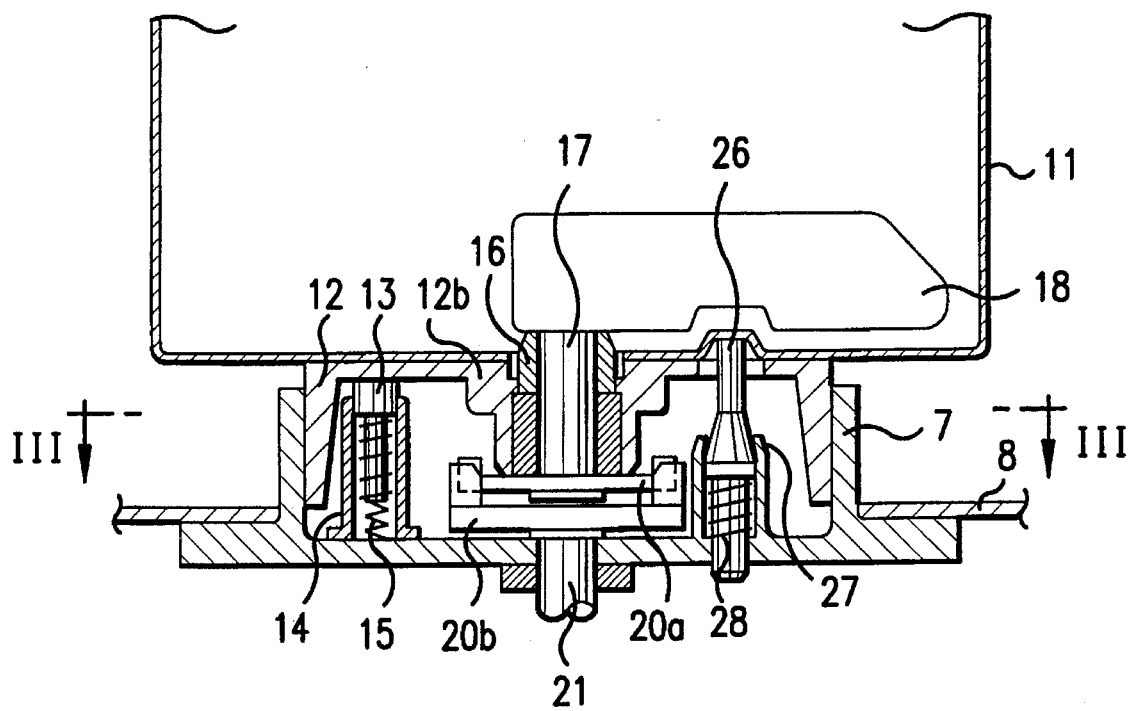
FIG. 2 is an expanded sectional view of main parts of the bread maker.

FIG. 1 is a sectional view of a bread maker according to the present embodiment and FIG. 2 is an expanded sectional view of main parts of the bread maker. A bread maker 1 has a bottom case 3 and a top case 4 constructing a main body case 2, and a lid 5 arranged to open and shut on the top case 4. In an inner bottom of the bottom case 3, a stand frame 6 is fixed, and an inner case 8 is fixed through a bearing plate 7 on the stand frame 6. At the internal wall of the inner case 8a, radiating heater 9 is arranged annularly. The outer wall of the inner case 8 is surrounded by an insulating plate 10. Inside of the inner case 8, a bread case 11 having an open top is removably set. The bread case 11 holds ingredients: flour, yeast and so on which make a dough along with water, and mixes and kneads the ingredients, allows time for the dough to rise and does the baking.

Figure 3:
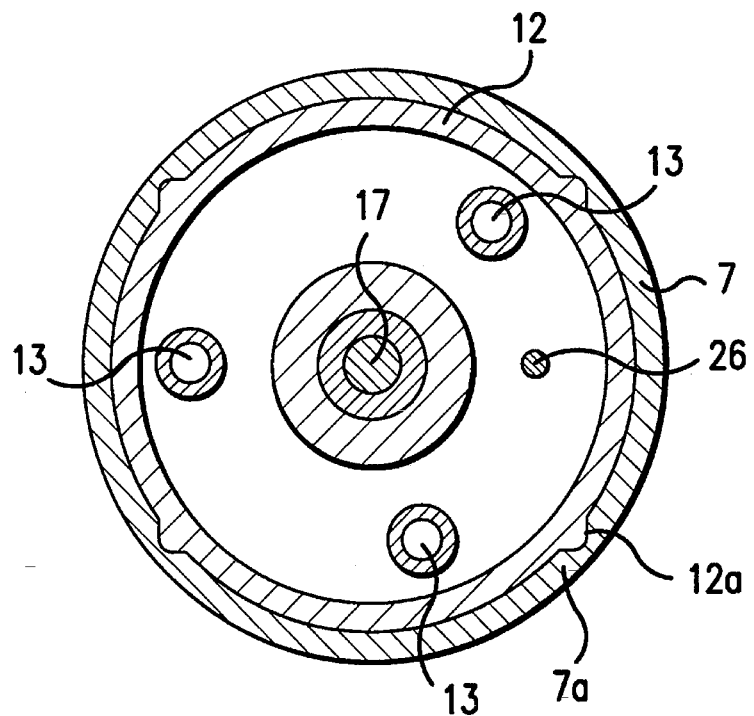
FIG. 3 is a sectional view taken in the line III—III of FIG. 2.

The bread case 11 is set on the bearing plate 7 by engaging a barrel-shaped part of a stand plate 12 which is fixed on the bottom of the bread case 11 with a barrel-shaped part of the bearing plate 7. At this time, as shown in FIG. 3, by engaging ribs 12a provided on the stand plate 12 with grooves 7a provided on the bearing plate 7, the bread case 11 can slide up and down and cannot turn around. The bread case 11 is on a weight sensor 13 and the weight sensor 13 supports the weight of the bread case 11. The weight sensor 13 is guided by a sleeve 14 provided on the bearing plate 7 and urged upward by a spring 15. The weight sensor 13 outputs a weight signal on receiving a stress from the weight of the bread case 11 and ingredients placed therein. The weight sensor 13 is arranged at three points on the circle and signal consists of the sum of all signals received from the three points.

Furthermore, at the center of the bottom of the stand plate 12 of the bread case 11, a bearing part 12b is arranged and an upper rotational shaft 17 is supported via a metal bushing 16. On the upper end of the upper rotational shaft 17, a kneading blade 18 for kneading the dough at the bottom of the bread case 11 is fixed. The lower end of the upper rotational shaft 17 is connected with a clutch body 20a. On the same axis as the upper rotary shaft 17, a lower rotary shaft 21 is rotatably supported by the bearing plate 7. At the upper end of the lower rotary shaft 21, a clutch body 20b capable of engaging with the clutch 20a is connected. To the lower end of the lower rotary shaft 21, a pulley 22a is connected. In addition, on the stand frame 6, a kneading motor 23 is provided and a motor shaft 24 thereof is connected to a pulley 22b. A belt 25 connects the pulleys 22a and 22b. By the above-stated construction, rotation of the kneading motor 23 is transmitted to the lower rotary shaft 21 and, via the clutches 20b and 20a, sent to the upper rotary shaft 17. As the result, the kneading blade 18 is driven.

Additionally, on .the bearing plate 7, at an eccentric position from the center of the upper rotary shaft 17, a thermistor 26 is provided to detect temperature of the bread case 11. The thermistor 26 is guided by a sleeve 27 formed on the bearing plate 7 and urged upward by a spring 28. The thermistor 26 contacts with the bottom of the bread case 11 through an open window of the stand plate 12. Also, on inner surface of the bread case 11, a bar 29 is provided with a projection to prevent the dough from moving together with the kneading blade 18. In addition, inside of the upper case 4, a fan 30 and a fan motor 31 for cooling the bread case 11 after baking bread are provided. Furthermore, at the front of the main body 2, a control panel 32 is arranged and a control circuit substrate 33 is provided therein.

FIG. 4 is a block diagram of a control circuit of the bread maker according to the present embodiment. CPU 41, ROM 42, RAM 43 and other components construct a microcomputer for controlling the bread making operation of the bread maker 1, based on any of variety of information inputted. In ROM 42, a sequence program indicating predetermined process of bread making and each processing time data are stored. In RAM 43, any of variety of data and so on are memorized. At the control panel 32, a power switch 44, weighing key 45 for ordering to weigh, a start key 46 for starting bread making operation, LED display unit 47 for indicating driving condition and the like, a buzzer 48 for alarming in the event the unusual occurs, and so on are provided. Signals from the weight sensor 13 and the thermistor 26 are inputted to CPU 41 through A/D converter respectively. Moreover, CPU 41 controls the heater 9, the kneading motor 23 and the fan motor 31. Also, plural levels are set in accordance with the ratio of water to the ingredients and, in response to each level, appropriate data for each processing time for the kneading process to knead the dough by the kneading blade 18, the rising process to rise kneaded dough and the baking process by the heater 9, previously obtained experimentally, is memorized in ROM 42.

Figure 5:
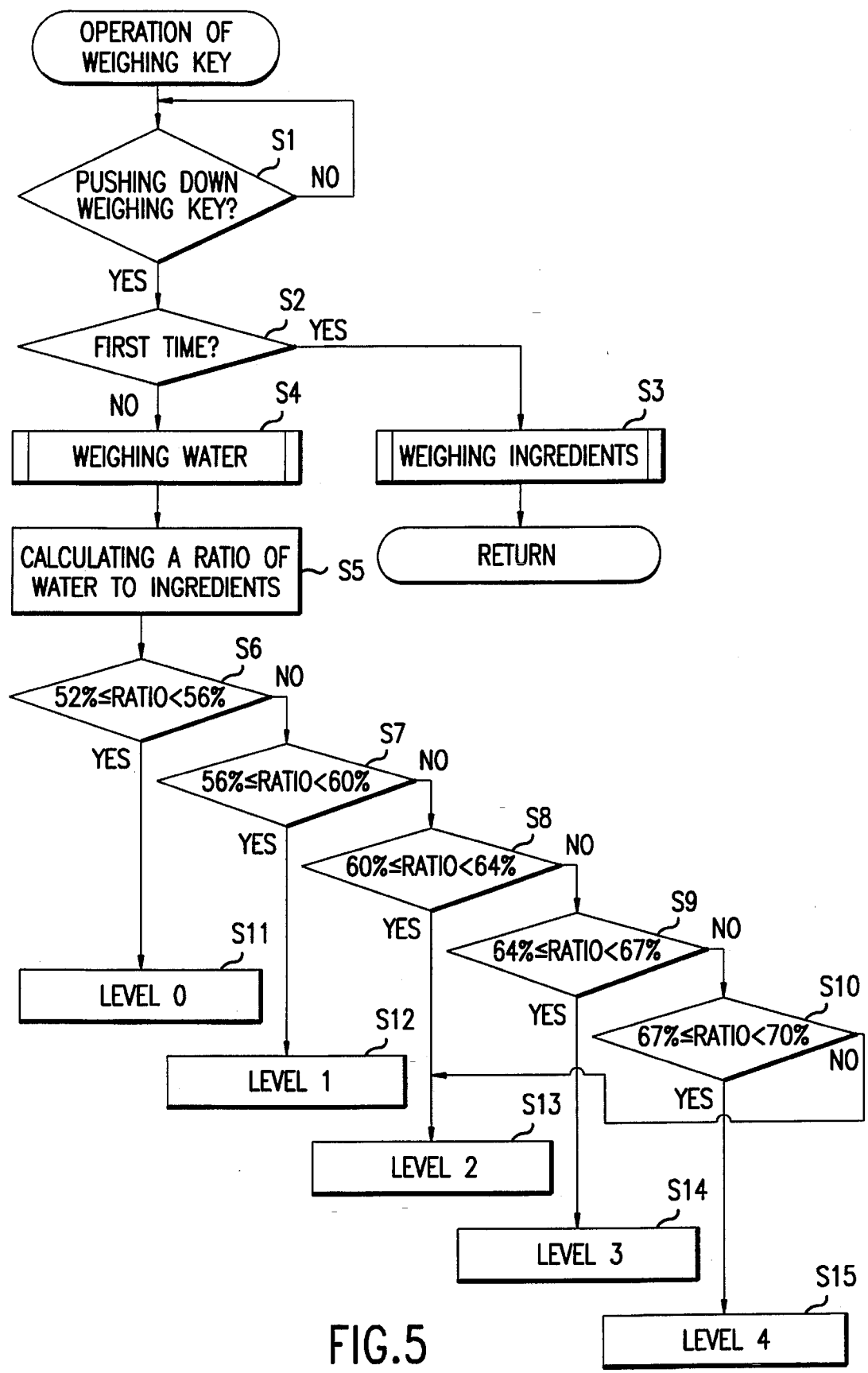
FIG. 5 is a flowchart of a weighing key operation of the bread maker.
Figure 6:
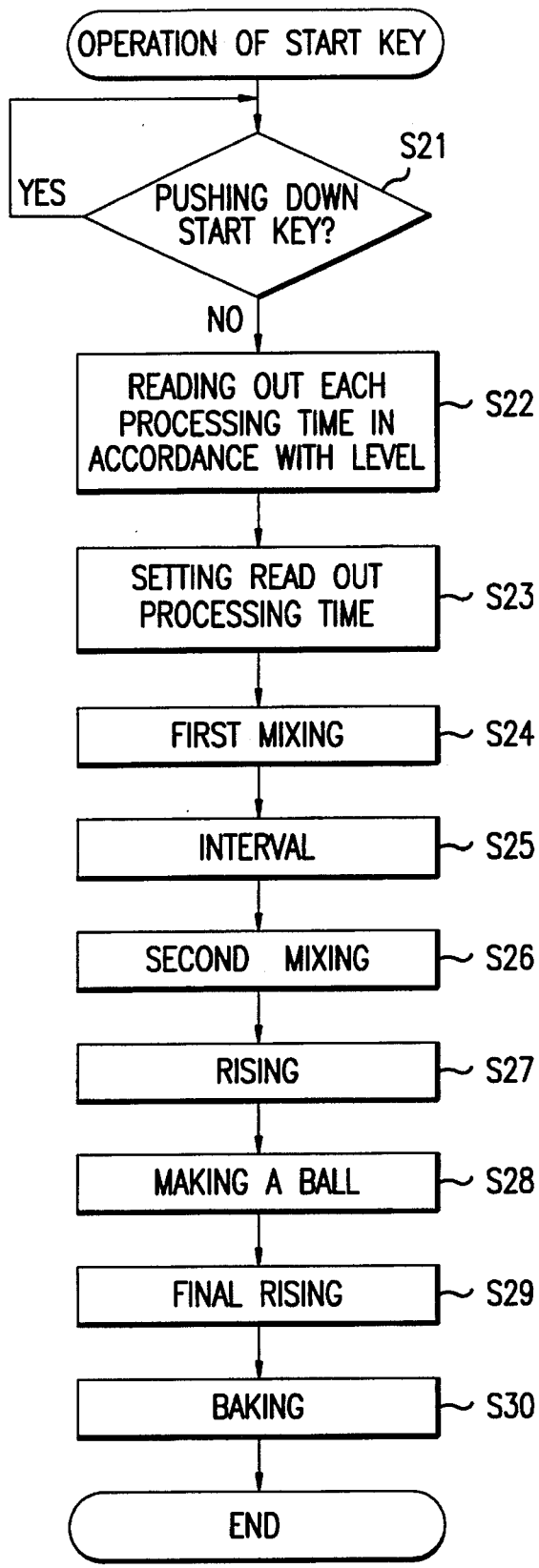
FIG. 6 is a flowchart of a start key operation of the bread maker.

Next, the bread making operation by the bread maker 1 constructed as stated above is explained by reference to flowcharts of FIGS. 5 and 6. After switching on the bread maker 1 by the power switch 44, first, ingredients for dough: flour, yeast, seasoning and so on (hereinafter referred to as ingredients) are putted into the bread case 11. It is acceptable that the volume in this time is weighed roughly or measured by eye without. using any measuring instrument. In this condition, upon pushing down the weighing key 45 (YES at step S1 in FIG. 5), that is examined at the first affirmative pushing down or not decision (at step S2). if YES at step S2, CPU 41 reads a detected signal from the weight sensor 13 and weighs the ingredients (at step S3: first weighing operation) Next, water is poured into the bread case 11. It is also acceptable that the volume of water is weighed roughly or measured by eye without using any measuring instrument. After putting water into the bread case 11, pushing down the weighing key 45 again, this being the second pushing down (NO at step S2), instructs the CPU 41 weigh the water (at step S4: second weighing operation). In the second weighing operation, the weight including ingredients and water is actually measured, and the, weight of the water is calculated.

Then, CPU 41 calculates the ratio of water to the ingredients (at step S5) and, in accordance with the obtained ratio, judges which level the ratio belongs to (at steps S6–S10) and determines a level for operation (at steps S11–S15). Regarding level determination, there are 5 levels, as shown in FIG. 7, which set as follows: if the ratio of water to the ingredients is more than 52% and less than 56%, it belongs to level 0, the ratio is more than 56% and less than 60%, it belongs to level 1, if the ratio is more than 60% and less than 64%, it belongs to level 2 (standard), if the ratio is more than 64% and less than 67%, it belongs to level 3 and if the ratio is more than 67% more than less than 70%, it belongs to level 4. Those data is memorized in ROM 42 as before-mentioned In addition, if the ratio is less than 52% and more than 70%, since it is out of regulation, error operation is executed. Regarding the error operation, after alarming by the buzzer 48, error is indicated on the LED display unit 47 and it is forced to set to level 2 (standard). On the LED display unit 47, instructions to operate keys and determined level is indicated for user.

Upon pushing down the start key 46 (YES at step S21 in FIG. 6), each processing time data memorized in ROM 42 concerning the determined level is read out (at step S22). Each processing time data is memorized in RAM 43 and set (at step S23). Based on the set processing time and sequence program of the bread making process stored in ROM 42, first kneading (at step S24), taking interval (at step S25), second kneading (at step S26), rising (at step S27), making a ball (at step S28), final rising (at step S29) and baking (at step S20) are carried out sequentially. An example of each processing time corresponding to determined level is shown in FIG. 7. Regarding each processing time, since a ratio of water to the ingredients of level 4 side is larger than that of level 0 side, for example, it has feature that time for final rising is short and, to the contrary, time for baking is long. Still, when the rising or baking process is executed, CPU 41 controls volume of electric power transmitted to the heater 9, based on the temperature detected by the thermistor 26 and controls to stabilize the temperature within the bread case 11.

According to the bread maker of the present embodiment, in view of the above, since processing time in accordance with a level determined by the ratio of water to the ingredients is carried out, if the ingredients and water are determined approximately by eye measurement, without using any measuring instrument and the weight of the ingredients are above or below the standard, high-quality bread is still always obtained.

Also, according to the bread maker of the present embodiment, it is necessary that, initially, weighing operation of only ingredients is carried out, and then, after pouring water, the weighing operation is carried out again. However, in case that the ingredients and water are putted into the bread case 11 without first weighing by mistake, since determination of level cannot be executed, an error operation as the above is executed.

Furthermore, the present invention may be embodied in several forms without departing from the spirit of essential characteristics thereof. For example, in the above-mentioned present embodiment, in case that the ratio of water to the ingredients is out of the regulation, error operation is executed and it is forced to set to the level 2 (standard). However, it is acceptable that, in case that the ratio is below the regulation, it is forced to set to level 0, or, in case that the ratio is above the regulation, it is forced to set to level 4. Moreover, as an error operation, it is allowable to have a user change the volume of ingredients or water and to weigh each of them again. Also, it is optionally feasible to add a level for the ratio of water to the ingredients.

In view of the above, according to the present invention, even if a ratio of weight of ingredients to weight of water is above or below the regulation, since appropriate processing time is set automatically in accordance with the ratio, high-quality bread always can be made. Additionally, even if the ingredients and water are prepared roughly by eye measurement without using any measuring instrument, since trouble does not occurs, it is convenient.

Also, by using one weighing order key, the weight of ingredients and the weight of ingredients and water can be measured, so operation becomes simple.

In addition, since the ingredients and water disposed in the bread case are weighed directly by a weight sensor, it does not cause inconvenience in measuring.

Furthermore, when the ratio of weight of water to the weight of the ingredients is out of predetermined range, it is judged an error operation, and a user can be warned or urged to reset, so that, unacceptable bread is not made.

What is claimed is:

1. A bread maker for making bread from ingredients and water, the bread maker comprising:

a bread case for holding said ingredients and water;

a kneading means for kneading the ingredients and water in the bread case;

a heating means for heating the bread case for the purpose of baking;

a first weighing means for weighing the ingredients following placement thereof into the bread case and prior to introduction of the water;

a second weighing means for weighing the ingredients and the water together following introduction of the water into the bread case and calculating means for determining a weight of the water based on output from the first and second weighing means;

a memorizing means for storing processing time data based on a ratio of a weight of the water to the weight of the ingredients, said processing time data including a kneading time period of a kneading process executable by the kneading means, a rising time period for a rising process for rising kneaded dough and a baking time period for a baking process executable by the heating means; and a control means for controlling the kneading means and the heating means based on said processing time data read from the memorizing means in accordance with the ratio of the weight of the water to the weight of the ingredients calculated by the calculating means to carry out the kneading process, the rising process and the baking process sequentially for making bread.

2. A bread maker according to claim 1, further comprising a weighing order key means for operating the first and second weighing means by ordering operation of said first weighing means by a first operation of said weighing order key means and operation of said second weighing means by a second sequential operation of said weighing order key means following said first operation.

3. A bread maker according to claims 1 or 2, the bread maker further comprising a weight sensor on which the baking case is positioned.

4. A bread maker according to claims 1 or 2, wherein the control means includes means for executing an error operation upon detection of the ratio of the weight of water to the weight of the ingredients being out of a predetermined range.

5. A bread maker according to claims 1 or 2, wherein said control means includes a plurality of ratio ranges each associated with a set of said operating time data and means for selecting one of said plurality of ranges corresponding to said ratio of the water to the ingredients and reading said associated operating time data to determine said kneading, rising and baking time periods.

6. A bread maker according to claim 5, wherein execution of the error operation includes selection of a predetermined standard level operation corresponding to selection of standard kneading, rising and baking time periods from said operating time data.

7. A bread making apparatus comprising:

a bread container for holding bread ingredients and water during kneading, rising and baking;

kneading means for kneading the ingredients and water in the bread container;

heating means for heating the ingredients and water in the bread container;

a first weighing means for determining a weight of the ingredients in the bread container prior to the addition of water;

a second weighing means for determining a weight of the ingredients and water in the bread container;

calculating means for calculating a water/ingredients weight ratio of a weight of the water in the bread container to the weight of the ingredients in the bread container based on the weight of the ingredients and water in the bread container and the ingredients in the bread container;

a control means for controlling the kneading means and the heating means to carry out a kneading process during a kneading time period, a rising process during a rising time period and a baking process during a baking time period; and processing means for determining said kneading time period based on said water/ingredients weight ratio.

8. The bread making apparatus of claim 7 wherein said processing means includes a memory having processing time data, obtained experimentally, corresponding to ratio ranges of a weight of water to a weight of the ingredients, and means for selecting said kneading time period from said processing time data based on said water/ingredients weight ratio.

9. The bread making apparatus of claim 7 further comprising processing means for determining said rising time period based on said water/ingredients weight ratio.

10. The bread making apparatus of claim 9 further comprising processing means for determining said baking time period based on said water/ingredients weight ratio.

11. The bread making apparatus of claim 7 further comprising processing means for determining said baking time period based on said water/ingredients weight ratio.

12. A bread making apparatus comprising:

a bread container for holding bread ingredients and water during kneading, rising and baking;

kneading means for kneading the ingredients and water in the bread container;

heating means for heating the ingredients and water in the bread container;

a first weighing means for determining a weight of the ingredients in the bread container prior to the addition of water;

a second weighing means for determining a weight of the ingredients and water in the bread container;

calculating means for calculating a water/ingredients weight ratio of a weight of the water in the bread container to the weight of the ingredients in the bread container based on the weight of the ingredients and water in the bread container and the weight of the ingredients in the container;

a control means for controlling the kneading means and the heating means to carry out a kneading process during a kneading time period, a rising process during a rising time period and a baking process during a baking time period; and processing means for determining said rising time period based on said water/ingredients weight ratio.

13. The bread making apparatus of claim 12 wherein said processing means includes a memory having processing time data, obtained experimentally, corresponding to ratio ranges of a weight of water to a weight of the ingredients, and means for selecting said rising time period from said processing time data based on said water/ingredients weight ratio.

14. The bread making apparatus of claim 12 further comprising processing means for determining said baking time period based on said water/ingredients weight ratio.

15. A bread making apparatus comprising:

a bread container for holding bread ingredients and water during kneading, rising and baking;

kneading means for kneading the ingredients and water in the bread container;

heating means for heating the ingredients and water in the bread container;

a first weighing means for determining a weight of the ingredients in the bread container prior to the addition of water;

a second weighing means for determining a weight of the ingredients and water in the bread container;

calculating means for calculating a water/ingredients weight ratio of a weight of the water in the bread container to the weight of the ingredients in the bread container based on the weight of the ingredients and water in the bread container and the weight of the ingredients in the container;

a control means for controlling the kneading means and the heating means to carry out a kneading process during a kneading time period, a rising process during a rising time period and a baking process during a baking time period; and processing means for determining said baking time period based on said water/ingredients weight ratio.

16. The bread making apparatus of claim 15 wherein said processing means includes a memory having processing time data, obtained experimentally, corresponding to ratio ranges of a weight of water to a weight of the ingredients, and means for selecting said baking time period from said processing time data based on said water/ingredients weight ratio.

* * * * *